United States Patent [19]

Osanai

[11] 4,161,006
[45] Jul. 10, 1979

[54] TAPE CASSETTE-EJECTING INHIBITING DEVICE FOR A MAGNETIC TAPE APPARATUS

[75] Inventor: Akira Osanai, Hachioji, Japan

[73] Assignee: Olympus Optical Co., Ltd., Tokyo, Japan

[21] Appl. No.: 874,058

[22] Filed: Feb. 1, 1978

[30] Foreign Application Priority Data

Feb. 14, 1977 [JP] Japan .............................. 52/16425[U]

[51] Int. Cl.² ...................... G11B 15/00; G11B 23/00
[52] U.S. Cl. .................................... 360/137; 360/105
[58] Field of Search ................... 360/137, 105, 93, 94, 360/95, 96

[56] References Cited

U.S. PATENT DOCUMENTS

| 3,432,169 | 3/1969 | Schroder | 360/137 |
| 4,017,900 | 4/1977 | Katsurayana | 360/96 |
| 4,017,902 | 4/1977 | Sato | 360/137 |
| 4,087,844 | 5/1978 | Takahashi et al. | 360/96 |

FOREIGN PATENT DOCUMENTS 2005738  8/1971  Fed. Rep. of Germany ........... 360/137

*Primary Examiner*—Jay P. Lucas

[57] ABSTRACT

A tape cassette-ejecting device comprises an eject lever pivotably supported by a magnetic head-supporting plate and an eject control button selectively rotate the eject lever. When the eject control button is depressed, the eject control lever is rotated to push up a tape cassette when a magnetic head is apart from a magnetic tape, while it is not rotated when the magnetic head is contacted with the tape.

2 Claims, 4 Drawing Figures

TAPE CASSETTE-EJECTING INHIBITING DEVICE FOR A MAGNETIC TAPE APPARATUS

BACKGROUND OF THE INVENTION

This invention relates to a tape cassette-ejecting device for a magnetic tape apparatus such as a tape recorder and tape reproducing device.

The above-mentioned type of tape cassette-ejecting device is generally provided with safety means which prevents a tape cassette from being ejected by error while a magnetic head still contacts a magnetic tape received in the cassette.

There will now be described by reference to FIGS. 1 and 2 the construction and operation of the prior art tape cassette-ejecting apparatus. Referential numeral 1 denotes a supporting plate on which a magnetic head 2 is mounted. Referential numeral 3 shows an eject lever. The magnetic head-supporting plate 1 is so set on a substrate 4 as to slide parallel therewith. Upon depression of a push button, the magnetic head-supporting plate 1 begins to slide, causing the magnetic head 2 to be inserted into a cassette holder, brought into contact with a magnetic tape received in the cassette or removed from said tape. The eject lever 3 is pivoted to the surface of the substrate 4 so as to be rotated in a vertical direction upon depression of an eject control button 6, thereby pushing up a tape cassette 5 from below. A stopper 3a is projectively mounted on the lateral wall of the eject lever 3. While the magnetic head 2 is in contact with the magnetic tape, the magnetic head-supporting plate 1 brought above the stopper 3a prevents the vertical rotation of the eject lever 3. While, therefore, the magnetic head 2 touches a magnetic tape, the eject control button 6 cannot be depressed, thereby preventing a tape cassette 5 from being ejected by error.

However, the prior art tape cassette-ejecting apparatus has the drawback that since the magnetic head-supporting plate 1 lies above the stopper 3a of the eject lever 3, an erroneous depression of an eject control button 6 under such condition causes a depression force to be applied to the magnetic head-supporting plate 1, leading to the possibility of said supporting plate 1 or the stopper 3a of the eject lever 3 being deformed or damaged. This undesirable event raises a more important problem, because the recent miniaturization of a tape recorder demands a magnetic head-supporting plate and stopper to be made as small and thin as possible.

SUMMARY OF THE INVENTION

It is accordingly the object of this invention to provide a tape cassette-ejecting apparatus for a magnetic tape device which prevents a tape cassette from being ejected even when an eject control button is depressed by error while a magnetic head is still in contact with a magnetic tape, and further reliably saves a magnetic head-supporting plate or related parts from damage or deformation even at said erroneous depression of the eject control button.

DETAILED DESCRIPTION OF THE PREFERRED EMBODIMENT

Figure 3:
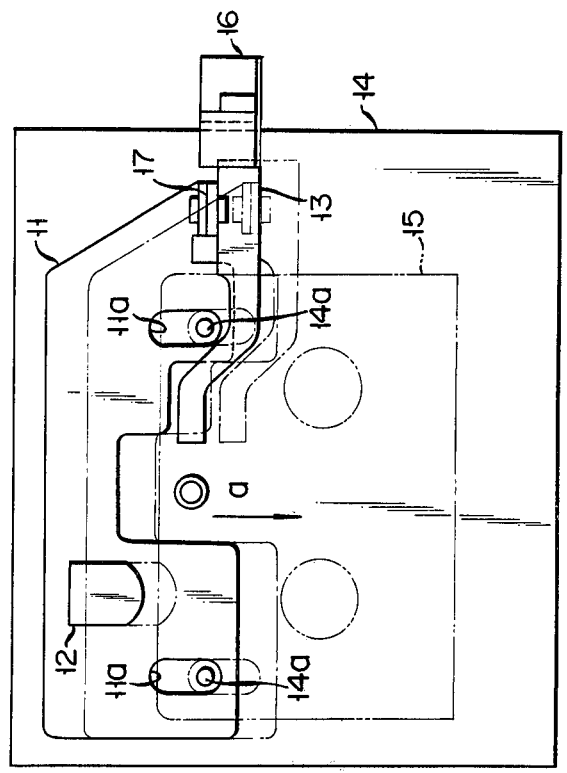
FIG. 3 is a plan view of a tape cassette-ejecting apparatus embodying this invention.
Figure 4:
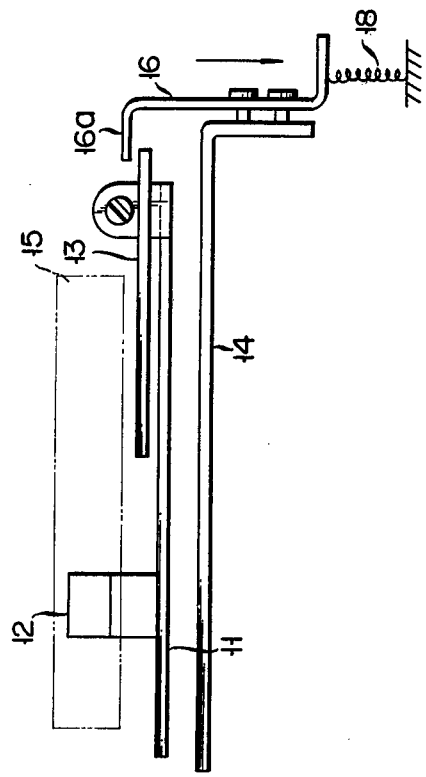
FIG. 4 is a front view of the same.
Figure 1:
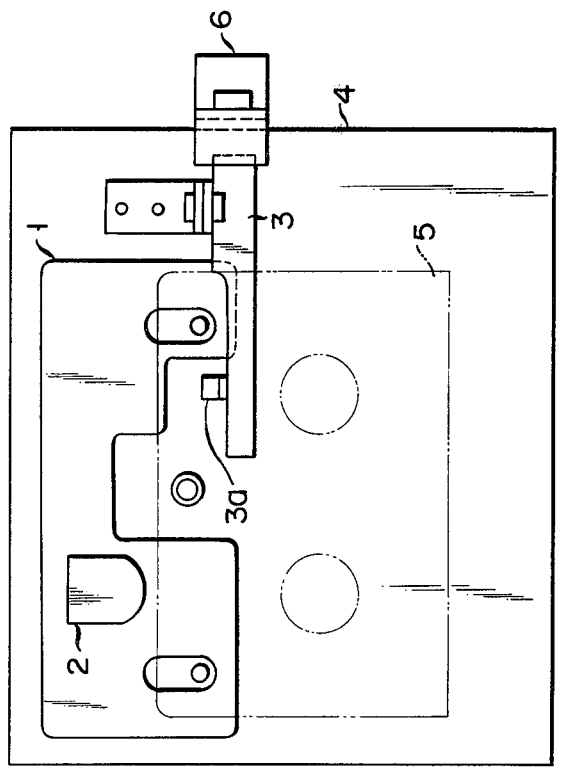
FIG. 1 is a plan view of the prior art tape cassette-ejecting apparatus.
Figure 2:
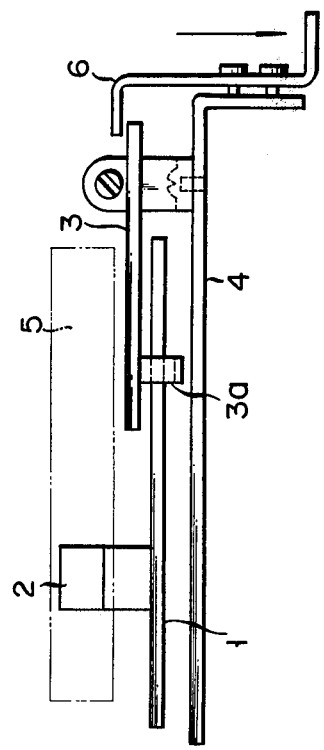
FIG. 2 is a front view of the same.

There will now be described by reference to FIGS. 3 and 4 a tape recorder provided with a tape cassette-ejecting apparatus embodying this invention.

Referential numeral 11 denotes a magnetic head-supporting plate. A magnetic head 12 is mounted on one end portion of the surface of said supporting plate 11. The magnetic head-supporting plate 11 spatially extends over a substrate 14 in parallel therewith the magnetic head-supporting plate 11 is bored with slits 11a, which loosely receive pins 14a projectively mounted on the surface of the substrate 14. Therefore the supporting plate 11 is made to slide forward relative to the substrate 14, namely, in the direction of the arrow a while being guided by the slit 11a and substrate pin 14a. An eject lever 13 is disposed above the magnetic head supporting plate 11 in the proximity of the front edge thereof. One end of the eject lever 13 extends into a loaded tape cassette to be brought below said tape cassette. The other end of the eject lever 13 extends to the proximity of the lateral edge of the substrate 14. The central part of the eject lever 13 is pivoted to a support member 17 projecting upward from the front edge of the other end portion of the magnetic head-supporting plate 11. Accordingly, the eject lever 13 can be rotated on a vertical plane about the pivotal support member 17. The lateral edge of the substrate 14 is fitted with a vertically slidable eject control button 16. The upper end of the eject control button 16 is horizontally bent above the eject lever 13 to constitute an eject lever-depressing section 16a. When the magnetic head-supporting plate 11 takes the rear position, then the bent depression section 16a of the eject control button 16 lies above the other end of the eject lever 13, as shown in solid lines in FIG. 3. When the magnetic head-supporting plate 11 is moved in the direction of the arrow a, then the depression section 16a is removed from above the other end of the eject lever 13, as illustrated in broken lines in FIG. 3. The eject control button 16 is normally urged upward by a spring 18, namely, in the opposite direction to that of the arrow (FIG.4).

Where, with the present tape cassette-ejecting apparatus constructed as described above, the eject control button 16 is depressed against the urging force of the spring 18 when a tape cassette 15 is inserted into a cassette holder, then the depression section 16a of the eject control button 16 depresses the other end of the eject lever 13. As the result, the eject lever 13 is rotated clockwise of FIG. 4. The free end of the rotated eject lever 13 pushes up the tape cassette 15 from below, thereby effecting its ejection. Where a control button (not shown) is depressed to cause the magnetic head-supporting plate 11 to be moved in the direction of the arrow a shown in FIG. 3, then the magnetic head 12 abuts against the tape, and the other end of the eject lever 13 is carried away from below the depression section 16a of the eject control button 16. Where, under this condition, the eject control button 16 is brought down, the depression section 16a of said eject control button 16 does not move the eject lever 13. But the eject control button 16 itself slides downward against the urging force of the spring 18. Therefore, the possibility does not arise that the eject lever 13 is rotated to eject a tape cassette.

With the tape cassette-ejecting apparatus of this invention constructed as mentioned above, even depression of the eject control button 16 does not actuate the eject lever 13 at all, while the magnetic head 12 does not contact a magnetic tape. Therefore, an erroneous operation of the eject lever 13 does not take place. Moreover, this invention does not forcefully stop the rotation of the eject lever 13 by a magnetic head-supporting plate 11 as in the prior art. Consequently, the magnetic head-supporting plate 11 or eject lever 13 is little subject to any unduly large stress and consequently saved from damage or deformation.

What is claimed is:

1. A tape cassette-ejecting device for a magnetic tape apparatus utilizing a cassette having a magnetic tape received therein, said device comprising a substrate; a magnetic head-supporting plate extending over the substrate and slidable between first and second positions; a magnetic head mounted on the magnetic head-supporting plate for joint movement therewith, said magnetic head being removed from the magnetic tape in the cassette when said supporting plate is in said first position and being in contact with the magnetic tape when said supporting plate is in said second position; an eject lever mounted on the magnetic head-supporting plate below the cassette for joint movement with said plate and being rotatable in a direction perpendicular to that in which the magnetic head-supporting plate is slidable; and an eject control button for rotating said eject lever movable in a direction perpendicular to that in which the magnetic tape-supporting plate is slidable, said eject control button being located such that when the magnetic head-supporting plate is in said first position movement of the eject control button will cause it to contact one end of the eject lever and rotate same so that the other end of said eject lever will push up the cassette, and when the magnetic head-supporting plate is in said second position movement of the eject control button will not cause it to contact said one end of the eject lever.

2. A tape cassette-ejecting device according to claim 1, wherein said eject control button is located directly above said one end of the eject lever when said magnetic head-supporting plate is in said first position, and said one end of the eject lever is moved away from below said eject control button when the magnetic head-supporting plate is moved to said second position.

* * * * *